(12) United States Patent
Duricic et al.

(10) Patent No.: US 12,399,058 B2
(45) Date of Patent: Aug. 26, 2025

(54) INTEGRATED COEFFICIENT OF THERMAL EXPANSION (CTE)-FLEX COUPLER

(71) Applicant: Lumentum Operations LLC, San Jose, CA (US)

(72) Inventors: Nenad Duricic, Ottawa (CA); Roozbeh Ahmadi, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 267 days.

(21) Appl. No.: 18/194,245

(22) Filed: Mar. 31, 2023

(65) Prior Publication Data

US 2024/0263995 A1    Aug. 8, 2024

Related U.S. Application Data

(60) Provisional application No. 63/483,889, filed on Feb. 8, 2023.

(51) Int. Cl.
*G01D 11/26* (2006.01)
*G01J 1/04* (2006.01)
*G01J 1/02* (2006.01)

(52) U.S. Cl.
CPC ............ *G01J 1/0403* (2013.01); *G01D 11/26* (2013.01); *G01J 2001/028* (2013.01)

(58) Field of Classification Search
CPC ... G01J 1/0403; G01J 2001/028; G01D 11/26
See application file for complete search history.

(56) References Cited

U.S. PATENT DOCUMENTS

2017/0122799 A1 * 5/2017 Okudo ................ G01J 1/0403

* cited by examiner

*Primary Examiner* — Jamel E Williams
(74) *Attorney, Agent, or Firm* — Harrity & Harrity, LLP

(57) ABSTRACT

An opto-mechanical package may include a package body having a first opening. The opto-mechanical package may include a coupler in the first opening of the package body. The coupler may have a second opening. The coupler may comprise a flexible element. A coefficient of thermal expansion (CTE) of a material of the coupler may be less than a CTE of a material of the package body. The opto-mechanical package may include a window in the second opening of the coupler. A CTE of a material of the window may be less than the CTE of the material of the coupler. The opto-mechanical package may include a first epoxy joint between a surface of the package body and a surface of the coupler. The opto-mechanical package may include a second epoxy joint between a surface of the coupler and a surface of the window.

20 Claims, 2 Drawing Sheets

INTEGRATED COEFFICIENT OF THERMAL EXPANSION (CTE)-FLEX COUPLER

CROSS-REFERENCE TO RELATED APPLICATION

This Patent Application claims priority to U.S. Provisional Patent Application No. 63/483,889, filed on Feb. 8, 2023, and entitled "INTEGRATED COEFFICIENT OF THERMAL EXPANSION (CTE)-FLEX COUPLER FOR A COMPRESSIVE WINDOW EPOXY SEAL." The disclosure of the prior Application is considered part of and is incorporated by reference into this Patent Application.

TECHNICAL FIELD

The present disclosure relates generally to a coupler in an opto-mechanical package and to an integrated coefficient of thermal expansion (CTE)-flex coupler for an opto-mechanical package.

BACKGROUND

An opto-mechanical package may house an optical assembly that is designed to provide light through a transparent window in a body of the opto-mechanical package. The transparent window may be, for example, a glass window that is positioned so as to allow an optical beam provided by the optical assembly to pass through the transparent window. Such an opto-mechanical package may be used in, for example, a spectroscopy application, a light detection and ranging (LIDAR) application, or a metrology application, among other examples. The opto-mechanical package in some cases may need to provide a hermetic enclosure for the optical assembly.

SUMMARY

In some implementations, an opto-mechanical package includes a package body having a first opening; a coupler in the first opening of the package body, the coupler having a second opening, wherein the coupler comprises a flexible element, and wherein a coefficient of thermal expansion (CTE) of a material of the coupler is less than a CTE of a material of the package body; a window in the second opening of the coupler, wherein a CTE of a material of the window is less than the CTE of the material of the coupler; a first epoxy joint between a surface of the package body and a surface of the coupler; and a second epoxy joint between a surface of the coupler and a surface of the window.

In some implementations, a device includes a package body having a first opening; a coupler arranged in the first opening and having a second opening, wherein the coupler is affixed to the package body by a first epoxy at an interface of the body and the coupler, and wherein the coupler comprises a flexible element associated with providing stress reduction; and a window arranged in the second opening, wherein the window is affixed to the coupler by a second epoxy at an interface of the coupler and the window, and wherein a CTE of a material of the coupler is between a CTE of a material of the package body and a CTE of a material of the window.

In some implementations, a package includes a package body; a coupler in an opening of the package body, the coupler and the opening of the package bodying have a round geometry; wherein a structure of the coupler includes a flexible element, and wherein a material of the coupler provides a CTE step between a material of the package body and a material of a window; the window in an opening of the coupler; a first epoxy joint at an interface of the package body and the coupler at the opening of the package body; and a second epoxy joint at an interface of the coupler and the window at the opening of the coupler.

DETAILED DESCRIPTION

Figure 1A:
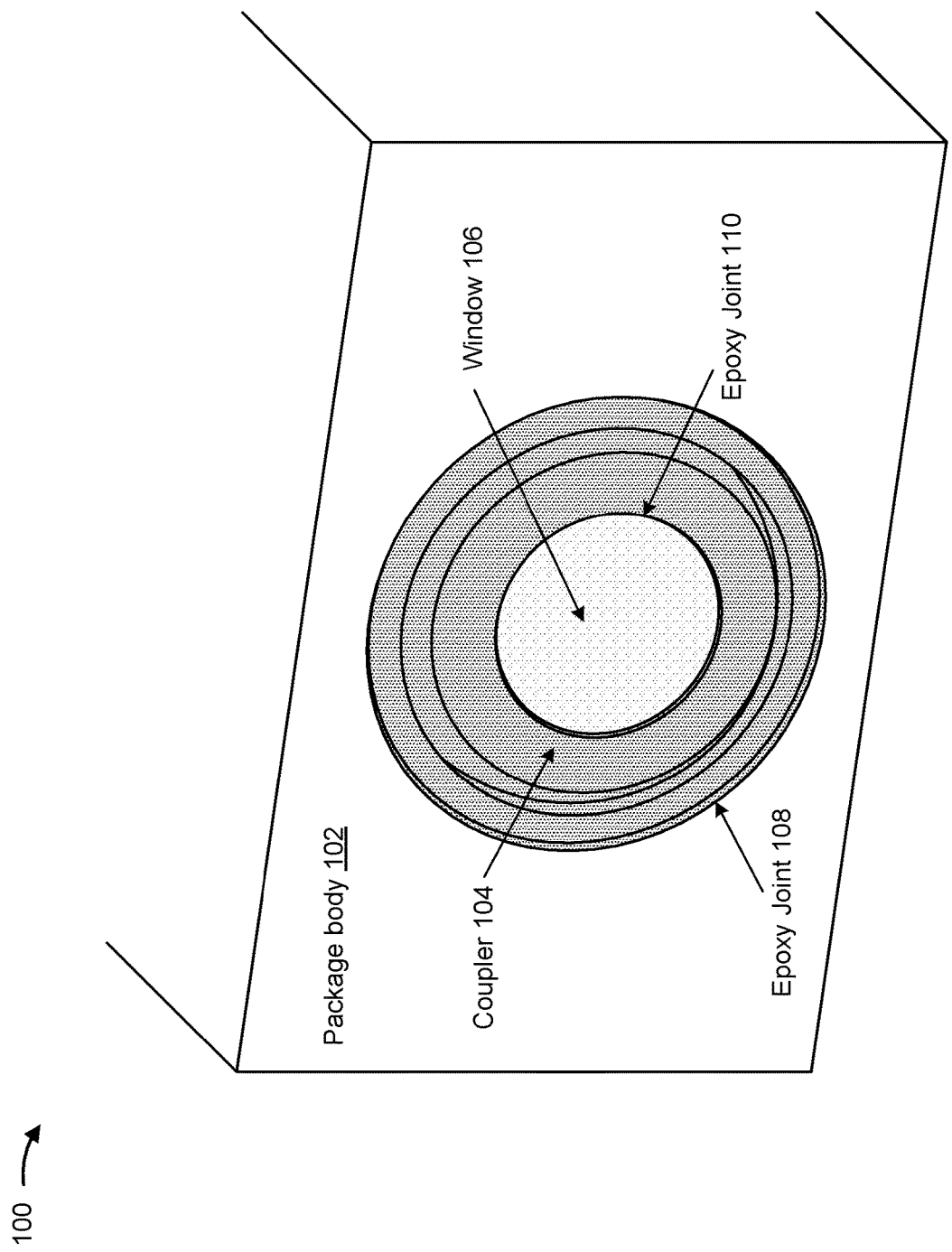
FIGS. 1A and 1B are diagrams of an opto-mechanical package including an integrated CTE-flex coupler as described herein.

The following detailed description of example implementations refers to the accompanying drawings. The same reference numbers in different drawings may identify the same or similar elements.

An opto-mechanical package may include a transparent window (e.g., a glass window) that allows an optical beam (provided by an optical assembly housed in the opto-mechanical package) to pass for use in a given application (e.g., spectroscopy, LIDAR, metrology, or the like). Due to low cost and ease of machining, aluminum is a desirable material for a package body of an opto-mechanical package. However, in practice, there may be a significant coefficient of thermal expansion (CTE) mismatch between a package body (e.g., an aluminum body) of the opto-mechanical package and the window (e.g., a glass window). As a result, providing a reliable epoxy seal between the package body and the window over changing temperature is difficult or impossible (e.g., amounts of expansion or contraction differ between the package body and the window for a given temperature change, thereby reduce reliability of the epoxy seal). For example, the CTE mismatch can cause high stress on the epoxy seal (e.g., a seal provided by an epoxy joint at an interface of the package body and the window) and, as a result, reduce reliability of the epoxy seal and therefore reduce reliability of the opto-mechanical device itself. Reliability of such an epoxy seal is particularly compromised when the opto-mechanical package is exposed to colder temperatures.

A typical standard for a window in an opto-mechanical package calls for a high strength glass with metallization and gold (Au)/nickel (Ni) plating around a perimeter, a package material that is CTE-matched with the high strength glass (e.g., Kovar), and an Au/Ni plated and an expensive soldering alloy, such as a gold-tin (AuSn) alloy. However, such materials may be prohibitively expensive or difficult to machine, and therefore increase cost and complexity of the opto-mechanical packaging.

Some implementations described herein provide an opto-mechanical package including an integrated CTE-flex coupler. In some implementations, the opto-mechanical package may include a package body having an opening, and an integrated CTE-flex coupler (herein referred to as a coupler) in the opening of the package body. The coupler may have a second opening and may comprise a flexible element. A CTE of a material of the coupler may be less than a CTE of a material of the package body. The opto-mechanical package may further include a window in the opening of the coupler. A CTE of a material of the window may be less than the CTE of the material of the coupler. The opto-mechanical package may further include a first epoxy joint between a surface of the package body and a surface of the coupler, and a second epoxy joint between a surface of the coupler and a surface of the window.

In some implementations, the coupler described herein provides a compressive epoxy seal for the window of the opto-mechanical package. Further, in some implementations, the coupler enables use of an epoxy seal in conjunction with a low cost and low strength window and in combination with a low-cost package body (e.g., an aluminum package body), while eliminating a need for metal plating. For example, the coupler may enable use of a high-CTE, low-cost opto-mechanical package, may provide a compressive epoxy seal, and may eliminate a need to use an expensive high-strength glass material (e.g., sapphire) for the window. In this way, cost of an opto-mechanical package can be reduced, while increasing reliability of epoxy seals of the opto-mechanical package, thereby increasing reliability of the opto-mechanical device. Additional details are provided below.

Figure 1B:
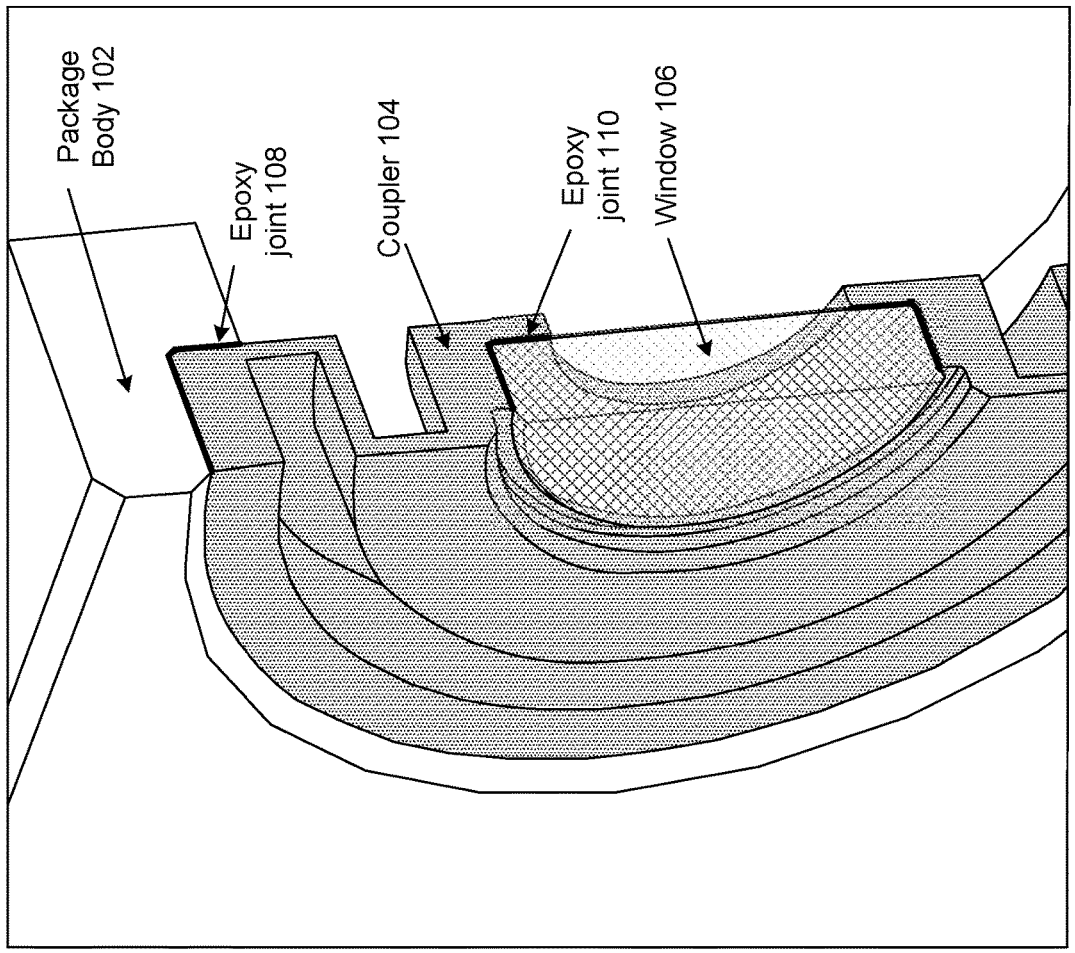

FIGS. 1A and 1B are diagrams of an opto-mechanical package 100 including an integrated CTE-flex coupler as described herein. As shown in FIG. 1A, the opto-mechanical package 100 includes a package body 102, an integrated CTE-flex coupler 104 (herein referred to as a coupler 104), and a window 106. As further shown, the opto-mechanical package 100 includes an epoxy joint 108 at an interface of the package body 102 and the coupler 104, and an epoxy joint 110 at an interface of the coupler 104 and the window 106. In some implementations, the package body 102, the epoxy joint 108, the coupler 104, the epoxy joint 110, and the window 106 provide a hermetic seal for the opto-mechanical package 100.

The package body 102 is a body of the opto-mechanical package 100. The package body 102 may house, for example, an optical assembly that is to generate an optical beam for transmission out of the opto-mechanical package 100 through the window 106. In some implementations, a material of the package body 102 may comprise aluminum.

In some implementations, the package body 102 comprises an opening, with the coupler 104 being arranged in the opening of the package body 102. In some implementations, the opening of the package body 102 has a round geometry. For example, as indicated in FIG. 1A, the opening of the package body 102 may have a circular geometry. As another example, the opening of the package body 102 may have an oval geometry. In some implementations, the geometry of the opening of the package body 102 (and the geometry of the coupler 104) results in a substantially cylindrical epoxy joint 108 at the interface of the package body 102 and the coupler 104, which reduces or eliminates stress concentration points on the epoxy joint 108 and therefore increases seal reliability. In some implementations, the opening of the package body 102 may have another type of geometry, such as a rectangular geometry (e.g., a square geometry with rounded or filleted corners).

As illustrated in the cross-section shown in FIG. 1B, the opening of package body 102 may in some implementations have a beveled or chamfered edge. In some implementations, the beveled or chamfered edge of the opening of the package body 102 improves formation of the epoxy joint 108 by enabling the use of capillary force to cause the epoxy material to flow between the package body 102 and the coupler 104 (e.g., such that the epoxy joint 108 is formed at the interface of the package body 102 and the coupler 104).

The coupler 104 is a component of the opto-mechanical package 100 that (1) acts as a CTE step between the package body 102 and the window 106, and (2) includes a flexible element that reduces stress on one or more other components of the opto-mechanical package 100 (e.g., the epoxy joint 110 and the window 106). In some implementations, the coupler 104 is arranged in the opening of the package body 102. In some implementations, as shown in FIGS. 1A and 1B, the epoxy joint 108 is formed between a surface of the package body 102 (a surface in the opening of the package body 102) and a surface of the coupler 104. In some implementations, the coupler 104 may comprise stainless steel.

In some implementations, the coupler 104 has a geometry that matches that of the opening of the package body 102. In some implementations, the coupler 104 has a round geometry. For example, as indicated in FIG. 1A, the coupler 104 may have a circular geometry. As another example, the coupler 104 may have an oval geometry. Alternatively, the coupler 104 may have another type of geometry, such as a rectangular geometry (e.g., a square geometry with rounded or filleted corners).

In some implementations, the coupler 104 comprises an opening in which the window 106 is arranged. In some implementations, the opening of the coupler 104 has a round geometry. For example, as indicated in FIG. 1A, the opening of the coupler 104 may have a circular geometry. As another example, the opening of the coupler 104 may have an oval geometry. In some implementations, the geometry of the opening of the coupler 104 (and the geometry of the window 106) results in a substantially cylindrical epoxy joint 110 at the interface of the coupler 104 and the window 106, which reduces or eliminates stress concentration points on the epoxy joint 110 and therefore increases seal reliability. In some implementations, the opening of the coupler 104 may have another type of geometry, such as a rectangular geometry (e.g., a square geometry with rounded or filleted corners).

In some implementations, the geometry of the opening of the coupler 104 (and the geometry of the window 106) may improve opto-mechanical stability (e.g., by preventing angular movement of the window 106). For example, the opening of the coupler 104 (and the window 106) may have a symmetrical geometry (e.g., a circular geometry), which may reduce a likelihood of tiling of the window 106 in the opening of the coupler 104 due to compressive stress on the window 106.

In some implementations, the coupler 104 comprises a flexible element. That is, a body of the coupler 104 may be structured so as to include a flexible element. As noted above, the flexible element is an element of the coupler 104 that reduces stress on one or more other components of the opto-mechanical package 100, such as the epoxy joint 110 and the window 106. In some implementations, the flexible element is designed to allow temporary deformation of the coupler 104 so as to reduce or eliminate stress on the window 106 or the epoxy joint 110 (e.g., stress caused by a change in temperature or pressure in an environment of the opto-mechanical package 100). In some implementations, reduction of stress on the window 106 reduces or eliminates a stress optic effect on the window 106 (e.g., a change of refractive index of the window 106 caused by stress), which would otherwise affect the optical beam passing through the window 106. Thus, the flexible element may increase reliability of the opto-mechanical device in part by reducing stress on the window 106.

In some implementations, the flexible element comprises one or more recesses in a body of the coupler 104. For example, as illustrated in the cross-section shown in FIG. 1B, the flexible element may include two grooves-a first groove on a first (outer) side of the coupler 104 and a second groove on a second (inner) side of the coupler 104. Additionally, or alternatively, the flexible element may comprise another feature, shape, or geometry in the body of the coupler 104. In some implementations, the flexible element of the coupler 104 may form a spring-like element to preserve stiffness within the epoxy joint 110.

The window 106 is a component of the opto-mechanical package 100 through which an optical beam (e.g., an optical beam generated by an optical assembly housed in the package body 102) can pass. In some implementations, the window 106 is arranged in the opening of the coupler 104. In some implementations, as shown in FIGS. 1A and 1B, the epoxy joint 110 is formed between a surface of the coupler 104 (a surface in the opening of the coupler 104) and a surface of the window 106. In some implementations, the window 106 may comprise a glass material (e.g., a low-cost glass material).

In some implementations, the window 106 has a geometry that matches that of the opening of the coupler 104. In some implementations, the window 106 has a round geometry. For example, as indicated in FIG. 1A, the window 106 may have a circular geometry. As another example, the window 106 may have an oval geometry. Alternatively, the window 106 may have another type of geometry, such as a rectangular geometry (e.g., a square geometry with rounded or filleted corners). In some implementations, the opening of the coupler 104 has a symmetrical geometry, which may reduce a likelihood of tiling of the window 106 in the opening of the coupler 104 due to stress on the window 106.

In some implementations, material selection of the package body 102, the coupler 104, and the window 106 enables the coupler 104 to act as a CTE step between the package body 102 and the window 106. That is, in some implementations, a CTE of a material of the package body 102 is greater than a CTE of a material of the coupler 104, and the CTE of the material of the coupler 104 is greater than a CTE of a material of the window 106. As one example, in some implementations, the package body 102 may comprise aluminum (CTE of approximately 23 parts per million per degree Celsius (ppm/° C.), the coupler 104 may comprise stainless steel (CTE of approximately 17 ppm/° C.), and the window 106 may comprise a low-cost glass (CTE of approximately 12 ppm/° C.). In some implementations, the CTE step provided by the coupler 104 reduces stress on one or more components of the opto-mechanical package 100 (e.g., the epoxy joint 108, the coupler 104, the epoxy joint 110, the window 106), thereby increasing seal reliability and, as a result, increasing reliability of the opto-mechanical device.

In some implementations, the use of materials with such a CTE relationship (i.e., package body CTE>coupler CTE>window CTE) creates compressive stress on the epoxy joint 108 and the epoxy joint 110 (e.g., in a radial direction if the epoxy seals are circular in shape), which increases seal reliability and enables hermeticity. For example, a curing temperature of the epoxy material may be approximately 120° C. Thus, after the epoxy material is installed to form the epoxy joint 108 and the epoxy joint 110, when the package body 102, the coupler 104, and the window 106 cool from the curing temperature (e.g., to room temperature), the epoxy joint 108 (at an interface between the package body 102 and the coupler 104) and the epoxy joint 110 (at an interface between the coupler 104 and the window 106) are in compression. Here, while the opto-mechanical package 100 is below the curing temperature (which should always be the case in a typical operating range of approximately −5° C. to approximately 70° C.), then there is a compressive seal at the epoxy joint 108 and at the epoxy joint 110, meaning that seal reliability is increased and hermeticity is achieved for the opto-mechanical package 100. Put another way, compressive seals at the epoxy joint 108 and the epoxy joint 110 can be provided through material selection of the coupler 104 so as to increase seal reliability and provide hermeticity.

As indicated above, FIGS. 1A and 1B are provided as examples. Other examples may differ from what is described with regard to FIGS. 1A and 1B. The number and arrangement of components shown in FIGS. 1A and 1B are provided as an example. In practice, there may be additional components, fewer components, different components, or differently arranged components than those shown in FIGS. 1A and 1B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An opto-mechanical package, comprising:
    a package body having a first opening;
    a coupler in the first opening of the package body, the coupler having a second opening,
        wherein the coupler comprises a flexible element, and
        wherein a coefficient of thermal expansion (CTE) of a material of the coupler is less than a CTE of a material of the package body;
    a window in the second opening of the coupler,
        wherein a CTE of a material of the window is less than the CTE of the material of the coupler;
    a first epoxy joint between a surface of the package body and a surface of the coupler; and
    a second epoxy joint between a surface of the coupler and a surface of the window.

2. The opto-mechanical package of claim 1, wherein the material of the package body comprises aluminum.

3. The opto-mechanical package of claim 1, wherein the material of the coupler comprises stainless steel.

4. The opto-mechanical package of claim 1, wherein the flexible element comprises one or more grooves in a body of the coupler.

5. The opto-mechanical package of claim 4, wherein the one or more grooves include a first groove on a first side of the coupler and a second groove on a second side of the coupler.

6. The opto-mechanical package of claim 1, wherein the first opening and the coupler have a circular geometry.

7. The opto-mechanical package of claim 1, wherein the second opening and the window have a circular geometry.

8. A device, comprising:
    a package body having a first opening;
    a coupler arranged in the first opening and having a second opening,
        wherein the coupler is affixed to the package body by a first epoxy joint at an interface of the package body and the coupler, and
        wherein the coupler comprises a flexible element associated with providing stress reduction; and
    a window arranged in the second opening,
        wherein the window is affixed to the coupler by a second epoxy joint at an interface of the coupler and the window, and
        wherein a coefficient of thermal expansion (CTE) of a material of the coupler is between a CTE of a material of the package body and a CTE of a material of the window.

9. The device of claim 8, wherein the material of the package body comprises aluminum.

10. The device of claim 8, wherein the material of the coupler comprises stainless steel.

11. The device of claim 8, wherein the flexible element comprises one or more grooves in a body of the coupler.

12. The device of claim 11, wherein the one or more grooves include a first groove on a first side of the coupler and a second groove on a second side of the coupler.

13. The device of claim 8, wherein the first opening and the coupler have a round geometry.

14. The device of claim 8, wherein the second opening and the window have a round geometry.

15. A package, comprising:
    a package body;
    a coupler in an opening of the package body, the coupler and the opening of the package bodying have a round geometry;
        wherein a structure of the coupler includes a flexible element, and
        wherein a material of the coupler provides a coefficient of thermal expansion (CTE) step between a material of the package body and a material of a window;
    the window in an opening of the coupler;
    a first epoxy joint at an interface of the package body and the coupler at the opening of the package body; and
    a second epoxy joint at an interface of the coupler and the window at the opening of the coupler.

16. The package of claim 15, wherein the material of the package body comprises aluminum.

17. The package of claim 15, wherein a material of the coupler comprises stainless steel.

18. The package of claim 15, wherein the structure of the flexible element comprises at least one groove.

19. The package of claim 15, wherein the coupler and the opening in the package body have a circular geometry.

20. The package of claim 15, wherein the window and the opening of the coupler have a circular geometry.

* * * * *